(12) United States Patent
Roy

(10) Patent No.: US 6,658,061 B1
(45) Date of Patent: Dec. 2, 2003

(54) MARGINABLE CLOCK-DERIVED REFERENCE VOLTAGE METHOD AND APPARATUS

(75) Inventor: Aninda Roy, San Jose, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 10/027,812

(22) Filed: Dec. 19, 2001

(51) Int. Cl.[7] .............. H04B 3/00; H04B 1/00; H04K 1/10
(52) U.S. Cl. .............. 375/257; 375/260; 455/69
(58) Field of Search .............. 324/76.11, 500, 324/537, 555, 601, 602, 612, 76.77, 119, 140 R, 166; 375/317, 318, 319, 257, 260, 285, 224; 455/69

(56) References Cited

U.S. PATENT DOCUMENTS

| | | | | |
|---|---|---|---|---|
| 5,510,706 A | * | 4/1996 | Good | 324/166 |
| 6,154,498 A | * | 11/2000 | Dabral et al. | 375/257 |
| 6,407,571 B1 | * | 6/2002 | Furuya et al. | 324/765 |
| 6,438,178 B1 | * | 8/2002 | Lysdal et al. | 375/317 |
| 6,529,564 B1 | * | 3/2003 | Brown | 375/318 |

* cited by examiner

*Primary Examiner*—Jay Patidar
*Assistant Examiner*—Donald M Lair
(74) *Attorney, Agent, or Firm*—Townsend and Townsend and Crew LLP

(57) ABSTRACT

A method for receiving data from a sending system in a receiving system includes receiving a pair of differential clock signals from the sending system, determining a reference voltage in the receiving system in response to the pair of differential clock signals, receiving a test data signal from the sending system, adjusting the reference voltage to form an updated reference voltage in response to the test data signal, receiving a single-ended data signal from the sending system relative to a reference voltage and determining a data signal in response to the single-ended data signal and to the updated reference voltage.

20 Claims, 3 Drawing Sheets

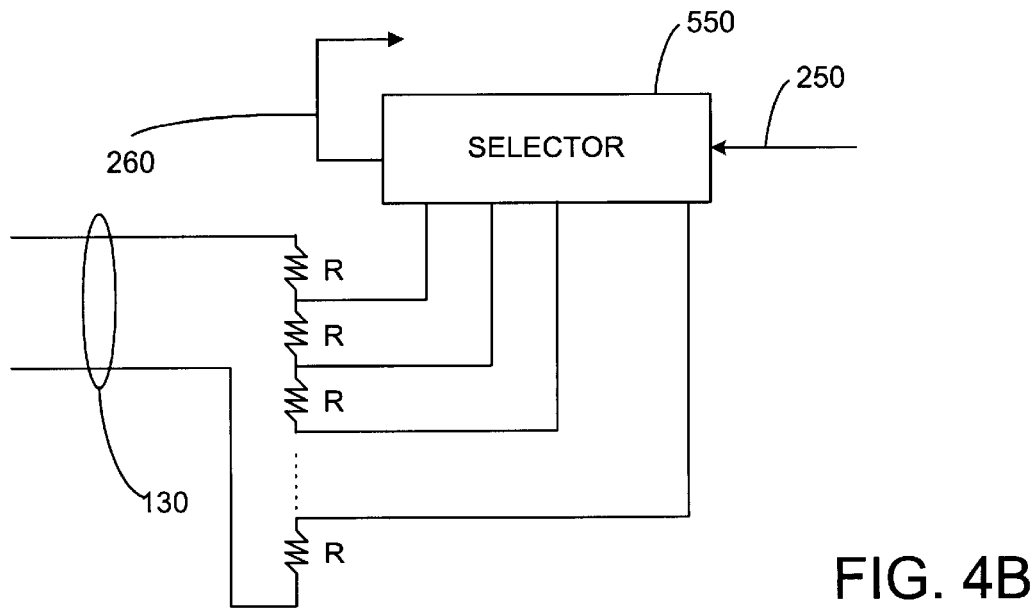
FIG. 4B
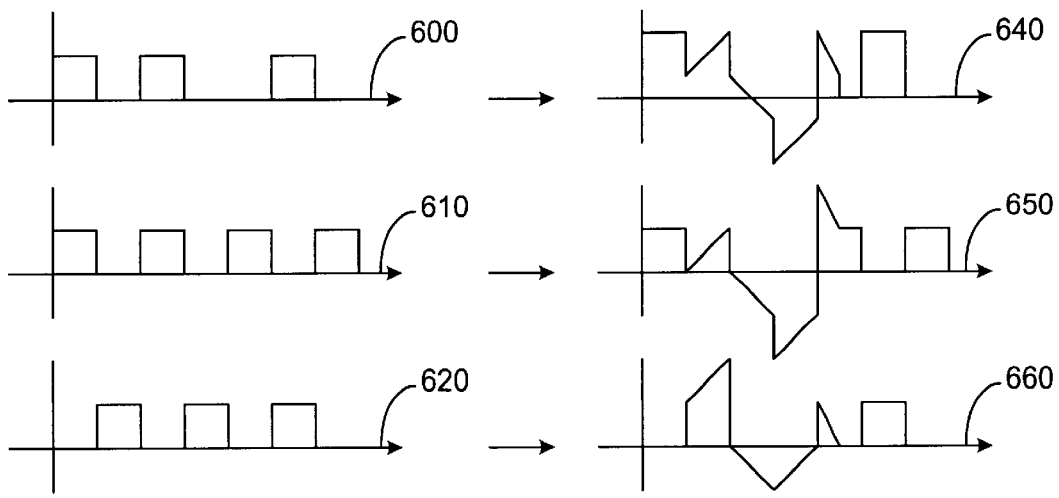
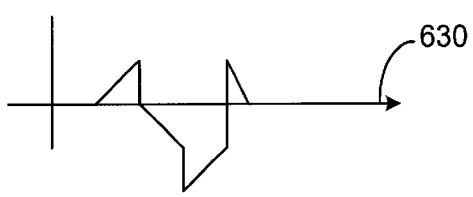
FIG. 5A
FIG. 5B
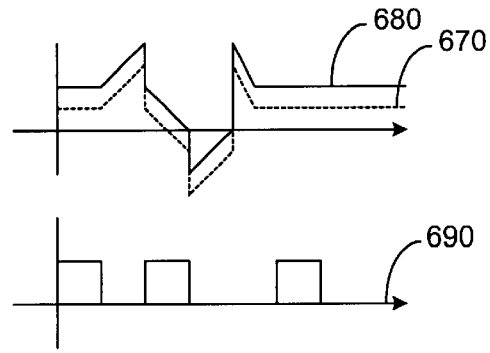
FIG. 5C

MARGINABLE CLOCK-DERIVED REFERENCE VOLTAGE METHOD AND APPARATUS

BACKGROUND OF THE INVENTION

The present invention relates to methods and apparatus for single-ended communication. More particularly, the present invention relates to single-ended signaling from a sending system to a receiving system.

It has been discovered by the inventor that a problem with single-ended signaling for system-to-system or chip-to-chip communications has been the variability of reference voltages used by the sending chip. Because single-ended signaling uses only one signal line to communicate a data signal across a wire, the data signal is sent relative to a reference voltage in the sending chip. The receiving chip then compares the received signal to a reference voltage generated or provided locally to the receiving chip. However, it was discovered by the inventor that one or more reference voltages used by the sending chip may vary over time because of the effects of heat, noise, power surges, and the like. These fluctuations in the reference voltage also appear on the data signal on the signal line. The problem determined by the inventor is that the receiving chip is unaware of the fluctuation in the reference voltage, thus, the data signal received on the signal line may be compared to the wrong reference voltage. Accordingly, the receiving chip may incorrectly interpret the data on the received data signal.

It has also been determined by the inventor that another problem with single-ended signaling is that signals may be voltage offset, or DC biased with respect to the reference voltage. For example, a signal on the signal line which should have voltages ranging from a first voltage to a second voltage may be received by the receiving system as different voltages. As an example, a signal may have a range from 0 to 3.0 volts with respect to a reference voltage of 1.5 volts, however, the receiving system may sense that the signal has a range from 1 to 4.0 volts. Causes of this offset may be due to variations in the characteristics of output drivers on the sending system (chip), noise, distance between the systems, variations in the characteristics of receivers on the receiving system (chip), and the like. These variations typically do not vary with time.

In light of above, the inventor has determined that it is desirable to develop methods and apparatus that address the above problems.

BRIEF SUMMARY OF THE INVENTION

The present invention relates to methods and apparatus for enhanced single-ended signaling communication. More particularly, the present invention relates to single-ended source-synchronous signaling methods and apparatus. The methods and apparatus may include "margining" techniques for calibrating reference voltages.

According to one aspect of the invention, a method for receiving data from a sending system in a receiving system is disclosed. One method may include receiving a pair of differential clock signals from the sending system, and determining a reference voltage in the receiving system in response to the pair of differential clock signals. Additional steps that may be performed include receiving a test data signal from the sending system, adjusting the reference voltage to form an updated reference voltage in response to the test data signal, and receiving a single-ended data signal from the sending system relative to a reference voltage. The technique may also include determining a data signal in response to the single-ended data signal and to the updated reference voltage.

According to another aspect of the invenion, an apparatus for receiving single-ended data signals and differential data signals from a sending apparatus is disclosed. One system may include a first circuit configured to detennine a reference voltage signal for the single-ended data signals in response to the differential data signals, and a second circuit coupled to the first circuit configured to determine an offset in a received data signal. Another system may also include a third circuit coupled to the first circuit and to the second circuit configured to adjust the reference voltage signal to form a margined reference voltage signal in response to the offset, and a fourth circuit coupled to the second circuit and to the third circuit configured to receive a single-ended data signal and a margined reference voltage and configured to output a data out signal. With such systems, the margined reference voltage is determined in response to the margined reference voltage signal. The system may be a stand alone computer, an integrated circuit, a memory, or the like.

According to yet another aspect of the invention, a system for receiving single-ended signaling data from a sending system is described. One such system may include a voltage generating unit configured to receive a differential clock pair from the sending system, configured to generate a reference voltage in response to the differential clock pair, and configured to generate an adjusted reference voltage, and an adjustment unit coupled to the voltage generating unit configured to determine an offset for the reference voltage and configured to direct the voltage generating unit to generate the adjusted reference voltage in response to the offset. Still other embodiments include a receiver unit coupled to the voltage generating unit and to the adjustment unit configured to receive a single-ended signaling data from the sending system, configured to receive the adjusted reference voltage, and configured to output adjusted data in response to the single-ended signaling data and to the adjusted reference voltage. In such systems, the adjusted reference voltage varies with time.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which:

FIGS. 4A–B illustrate additional embodiments of the present invention with reference to FIG. 2; and FIGS. 5A–C illustrate an example according to an embodiment of the present invention.

DETAILED DESCRIPTION OF THE INVENTION

Figure 1:
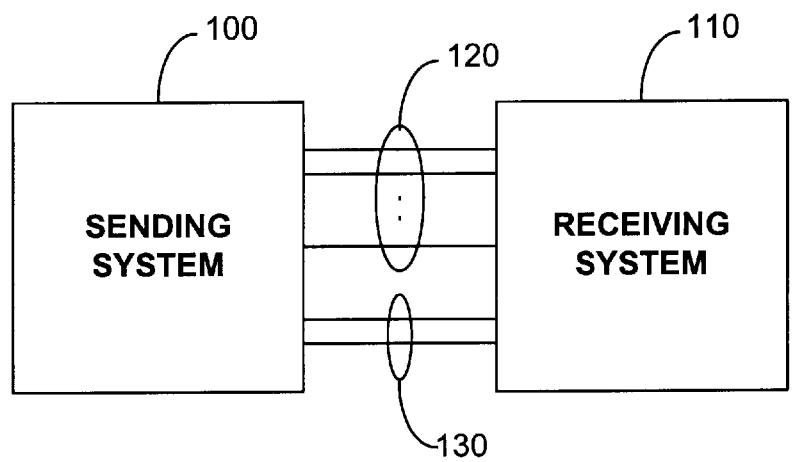
FIG. 1 illustrates a system level block diagram according to an embodiment of the present invention.

FIG. 1 illustrates a system level block diagram according to an embodiment of the present invention. FIG.1 illustrates a first system 100 and a second system 110 coupled by a series of signal data lines 120, and clock lines 130.

In the present embodiment, first system 100 and second system 110 may be embodied as separate IC chips on a circuit board. For example, first system 100 may be an ASIC, a communications chip, a memory chip, a processor, or any other type of chip that provides output data signals. Further, second system 10 may also be any ASIC, communications chip, memory chip, processor, or any other type of chip that receives data signals. In other embodiments, first system 100 and second system 110 may be different cells on an integrated circuit, may be different processing or memory systems (computers), or the like.

Accordingly, first system 100 and second system 110 may be millimeters apart, inches apart, and even feet apart.

In this embodiment, signal data lines 120 provide "single-ended" data signals between first system 100 and second system 110. As opposed to differential-data signals which provide a data signal over a pair of wires, each single-ended data signals is provided on a single wire. In this embodiment, it is contemplated that more than one signal data line is provided from first system 100 and second system 110.

Differential cock signals are passed on clock lines 130 between first system 100 and second system 110 in the present embodiment. By providing a timing clock, first system 100 and second system 110 are able to synchronize the timing of data signals provided between the systems. This has been discussed to provide a higher data communication rate between first system 100 and second system 110. In this embodiment, clock lines 130 are typically provided over a pair of wires and include clock and clock.

In this embodiment, it is contemplated that the typical rate for the clock are from 500 MHz and greater. Some embodiments include clock rates of 800 MHz and greater, and some embodiments include clock rates of 1 GHz and greater. It is believed by the inventor that the importance of this invention will increase with embodiments using even greater clock rates in the future.

Figure 2:
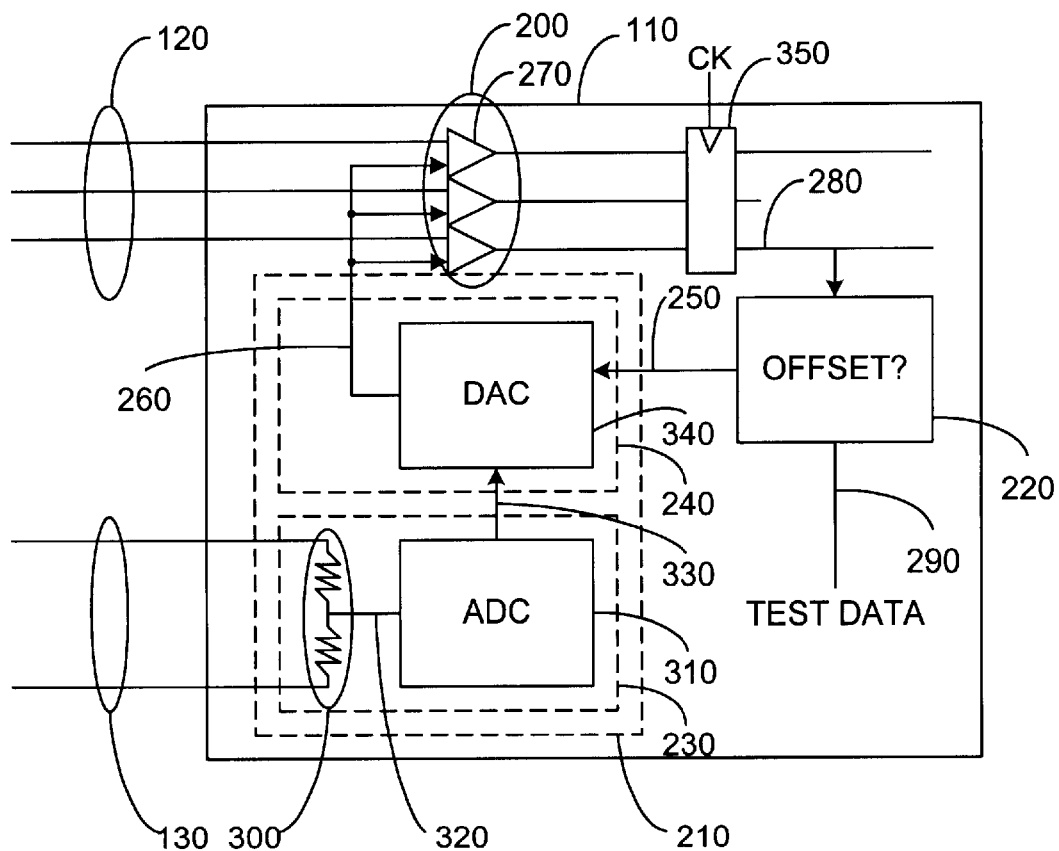
FIG. 2 illustrates a block diagram according to an embodiment of the present invention.

FIG. 2 illustrates a block diagram according to an embodiment of the present invention. In particular, FIG. 2 illustrates a more detailed diagram of second system 110, in FIG. 1.

In the present embodiment, second system 110 includes one or more receiver blocks 200, a voltage generating block 210, and an offset determination block 220. Depending upon the specific configuration, voltage generating block 210 may include a variety of sub blocks.

In the embodiment in FIG. 2, voltage generating block 210 includes a block 230 for determining a reference voltage and a block 240 for adjusting the reference voltage. As will be illustrated below, other ways for performing the above functions are contemplated by the inventor.

In the present embodiment, block 230 includes a voltage divider circuit 300 and an analog to digital converter (ADC) circuit 310. As illustrated, voltage divider circuit 300 is inserted between clock lines 130. In this embodiment, voltage divider circuit 300 is a divide by two (DBT) circuit. Because it has been discovered that the clock provided by sending system 100 also traces the reference voltage of first system 100, the output of voltage divider circuit 300 can be used to track the reference voltage within second syste 110.

The voltage, on a signal line 320 is then input to ADC circuit 310, in one embodiment, for conversion to a 6-bit word. The inventor contemplates that many possible implementations of ADC circuit 310 can be used in embodiments of the present invention. Further, the number of bits of resolution for ADC circuit 310 may be varied, for example, 4-bit words, 8-bit words, 12-bit words, or the like may be used in other embodiments. The digital representation of the reference voltage is then input to block 240 on signal lines 330.

In the present embodiment, block 240 includes a digital to analog converter (DAC) circuit 340 that receives the digitized reference voltage on signal lines 330. DAC circuit 340 also receives an offset signal from offset determination block 220 via signal line 250. In this embodiment, the offset signal is digitized and added to the digitized reference voltage. The resulting digital word is then used by DAC circuit 340. The output of DAC circuit 340 is a reference voltage signal that includes a voltage offset (positive, negative, or zero). The number of input bits for DAC circuit 340 may be similar to ADC circuit 310, for example, 4bits, 6-bits, 8-bits, and the like.

In the current embodiment, the output of voltage generating block 210 is typically a "margined reference voltage" on signal line 260. That is, a reference voltage that is adjusted for voltage offset. As discussed above, a voltage offset (inherent) may arise because of variations in the output drivers, variations in receiver blocks 200, and the like. The offset signal will be discussed further below.

Receiver block 200 is embodied in the present embodiment as one or more receiver circuits 270. In this embodiment, each receiver circuit 270 receives a data signal on signal line 120 and receives the margined reference voltage on signal line 260. In response, each receiver circuit 270 outputs an adjusted data signal on signal lines 280. These data signals are thereby adjusted for variations in first system 100 reference voltage and for any inherent offset in the output drivers and receiver circuits 270. In this embodiment, signal lines 280 are coupled to latches 350.

In the present embodiment, offset determination block 220 receives a data signal on one of signal lines 280, and receives a test data signal via signal line 290. Offset determination block 220 compares the signals and in response outputs the offset signal on signal line 250. Offset determination block 220 may output a series of offset signals on signal line 250 until the adjusted reference voltage is properly margined. That is, until the adjusted reference voltage has an offset that is small compared to an ideal reference voltage. This process will be explained further below.

In operation, a series of test data signals are first provided on signal lines 120 from first system 100 to second system 110. At the same time, in this embodiment, a differential clock pair is provided on clock lines 130. In response to the differential clock pair, voltage divider circuit 300 determines a reference voltage signal. This reference voltage signal is digitized by ADC circuit 310 and a digital word is output on signal lines 330.

In the case of initial test data signals, the offset specified by offset determination block 220 is typically zero (however, the offset may be set to any other initial offset desired.) In the case where zero offset is specified, DAC circuit 340 converts the digital word on signal lines 330 back to the reference voltage signal. The reference voltage signal and a test data signal on signal line 120 are then input into a receiver circuit 270. In response, receiver circuit 270 outputs a test data signal that has been adjusted to account for fluctuations in the reference voltage in first system 100.

In this embodiment, the adjusted test data signal is then compared by offset determination block 220 to the test data signal. As discussed above, the test data signal should be known ahead of time by second system 110. In response to the adjusted test data signal and the test data signal, offset determination block 220 determines an offset signal for DAC circuit 340.

In this example, the above process may repeat several times, until offset determination block 220 determines that no further adjustments in the offset would be beneficial. An example of this process will be given below.

In this example, once the offset signal has be determined, "actual" data may be transmitted from first system 100 to second system 110. When the reference voltage in first system 100 rises or falls, the voltage of data signals on signal lines 120 and of the differential clock signal on clock lines 130 will also rise and fall. Accordingly, the reference voltage determined on signal line 320 will also rise and fall. After adjustment for offset, the adjusted reference voltage is input to receiver circuits 270. This adjusted reference voltage will also rise and fall over time. Because both the data signals and the adjusted reference voltage rise and fall relatively synchronously, the output of receiver circuits 270 is the "correct" data signal from first system 100. An example of this is illustrated later below.

Figure 3A:
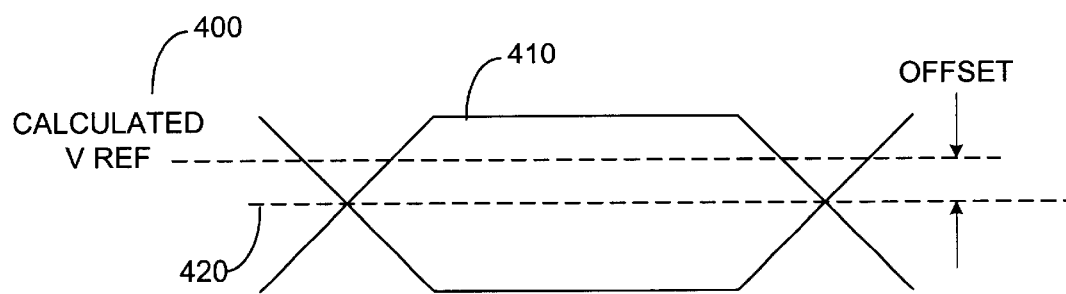
FIGS. 3A–B illustrate the process of determining an offset according to an embodiment of the present invention.
Figure 3B:
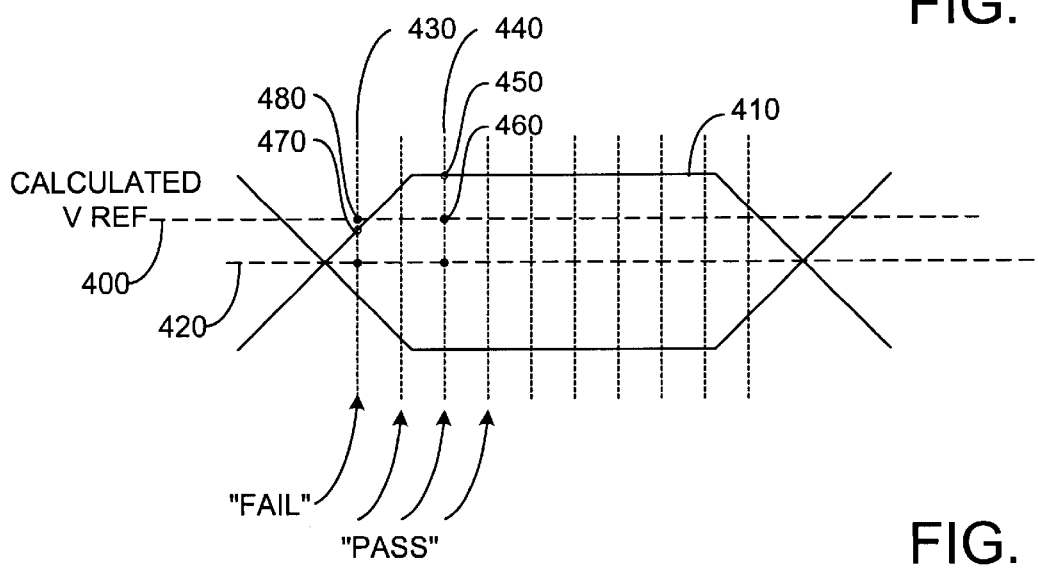

FIGS. 3A–B illustrate the process of determining an offset according to an embodiment of the present invention.

In one embodiment, offset determination block 220 may be a simple state machine with as little as three states: "adjust up," "adjust down," and "monitor." As will be described further below, offset determination block 220 moves from the monitor state to an adjust state when a "fail" condition is detected. Adjust states move back to the monitor state after an adjustment is made to the offset voltage.

FIG. 3A illustrates a data eye with a voltage offset relative to a reference voltage. In this example, the data eye is built-up from the test data that was discussed above. In this embodiment, a reference voltage 400 was initially determined in second system 110 based upon clock signals 130. However, because of biases, non-linearities, and the like in output transmitters and input receivers, the data eye 410 is centered around a different voltage 420. In this example, reference voltage 400 is higher than voltage 420, thus it is desired that reference voltage 400 be adjusted lower by an offset.

In FIG. 3B, a series of test locations including 430, 440 and tie like are illusiiated. In the present embodinment a series of twenty (20) test locations are used across the data eye, however a larger number or smaller number rnay also be used. In the current example, each of the test locations are locations where the voltage of data eye 410 are compared to the voltage of reference voltage 400 (and reference voltage with an added offset). Thus for example, at location 440, the voltage at point 450 on data eye 410 is compared to reference voltage 400, point 460. At this location, the voltage at point 450 is higher (a "1") relative to reference voltage 400 and the voltage at point 450 is higher (a "1") relative to voltage 420. Accordingly, at location 440, reference voltage 400 is considered a "pass" condition [[.]] because evaluation of point 450 with respect to reference voltage 400 and voltage 420 gives the same result.

In another example, at location 430, the voltage at point 470 on data eye 410 is compared to reference voltage 400, point 480. At this location, the voltage at point 470 is lower (a "0") relative to reference voltage 400 but the voltage at point 470 is higher (a "1") relative to voltage 420. Accordingly, at location 430, reference voltage 400 is considered a "fail" condition because evaluation of point 470 with respect to reference voltage 400 and voltage 420 give different results.

In the present embodiment, a series of such comparisons are performed for each of number of the test locations across the data eye. In response to such comparisons a Pass-Fail map such as "FFPPFF," "FFFFPPPPPPPPPPPPPFFF," "FFFFFFPPPPPPPPFFFFFFFF," or the like are formed. What is desired is that the reference voltage be adjusted by an offset amount that reduces the number of "Fail" conditions. Thus, in one example, before adjustment by an offset, the map may read "FFFFFFFFPPPPFFFFFFFFF," and after adjusting the reference voltage, the map may read "FPPPPPPPPPPPPPPPPPPPF," or the like. The amount of offset for reference voltage 400 may be determined as discussed below.

In the present embodiment, with a large number of "fail" conditions offset determination block 220 moves from a monitor state to an adjust state. In this embodiment there may be an "adjust up" state and an "adjust down" state. The adjust-up state may adjust the offset voltage up a "notch" and the adjust-down state may adjust the offset voltage down a "notch." In this embodiment, the "notch" may be a single bit of input to DAC 340. For example, as described above, the output of ADC circuit 330 may be a 6-bit word such as "110010." Accordingly, the adjusted reference voltage may be adjusted-up to "110011" or adjusted-down to "110001." In other embodiments, of the present invention, different increments for adjustment of the offset voltage may be used, for example, adjustment by "0010," "0011," and the like.

In another embodiment, the amount of offset adjustment may be constrained to a certain range around the reference voltage. As an example, the reference voltage may be approximately 750 mV, and the offset may be adjusted around the calculated reference voltage in 16 25 millivolt increments. For example, the reference voltage may be adjusted from 550 mV to 950 mV in 25 mV increments. In another embodiment the reference voltage may be adjusted for the offset from 500 mV to 1000 mv.

In the present embodiment, many different algorithms may be used to determine a usable offset voltage. For example, in one embodiment, a first pass/fail "map" described above is first generated using the reference voltage. If there is a large number of "fail" conditions, the state machine moves to the adjust-up state, and the offset voltage is incremented up. Next, the reference voltage is adjusted by the offset voltage, and a second "map" is generated. If the adjusted reference voltage causes a greater number of "fail" conditions, the state machine moves to the adjust-down state, and the offset voltage is decremented. The reference voltage is then adjusted down and the process above repeats. The process may repeat until any adjustment of the offset voltage up or down causes a greater number of "fail" conditions in a map. That is, it is desired to reduce and possibly minimize the number of "fail" conditions. Once such an offset voltage is determined, that offset voltage is used in subsequent normal operation of the system.

Many other algorithms may also be used for determining which offset to use. For example, in one embodiment, the system initially "sweeps through" all the possible offset voltages and collects pass/fail data map, as described above. The voltage offset that is selected is then the offset that produces the least number of "fail" conditions. As an example, using a first offset voltage, the adjusted reference voltage yields a map such as "FFFFPPFF;" using a second offset voltage, the adjusted reference voltage yields a map such as "FFPPPPPF;" and using a third offset voltage, the adjusted reference voltage yields a map such as "FFFPP-PFF." In such an example, the "maps" are compared, and it would be determined that the second offset voltage would be more desirable than the first or the third offset voltage as it results in fewer "fail" conditions.

Figure 4A:
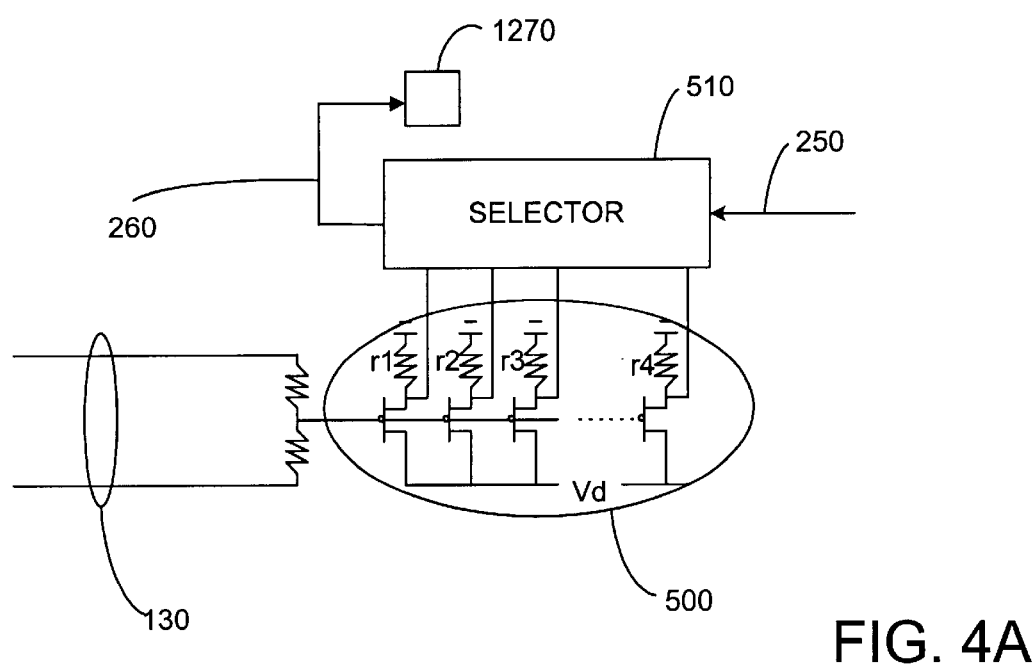

FIGS. 4A–B illustrate additional embodiments of the present invention with reference to FIG. 2.

In the embodiment illustrated in FIG. 4A, a series of source follower circuits 500 and a selector 510 are provided. In such an embodiment, the resistances r1, r2, r3 . . . of the source followers are adjusted to provide a range of voltages. These voltages correspond to the reference voltage adjusted by different offset voltages. One of these range of voltages is selected by selector 510 as the adjusted reference voltage for receiver circuits 270. The operation of the embodiment may be to the one above.

In the embodiment illustrated in FIG. 4B, voltage divider circuit 300 comprises a number of resistors R. In such an embodiment, the different "tap points" in voltage divider circuit 300 provide the range of voltages. These voltages correspond to the reference voltage adjusted by different offset voltages. One of these range of voltages is selected by a selector 550 as the adjusted reference voltage for receiver circuits 270.

The operation of the embodiment may be similar to the one above. For example, in such embodiments, selector 510 may supply each of the voltages at the shown tap points to receiver circuits 270 to build a pass/fail map. Selector 510 would then provide select the tap point that produces a reduced number of "fail" conditions. The reduced number may be zero "fail" conditions, a minimal number of "fail" conditions, a low number of "fail" conditions, a low symmetric number of "fail" conditions (such as "FFPPFF" not "FFFPPF"), or the like (481 FIGS. 5A–C illustrate an example according to an embodiment of the present invention. In particular, FIG. 5A illustrates a data signal 600 and differential clock signals 610 and 620 within first system 100. FIG. 5A also includes a reference voltage signal 630 that varies with time. FIG. 5B illustrates the same signals transmitted to second system 110 after accounting for reference voltage signal 630, 640–660. In FIG. 4B, a voltage offset may also appear in the data signal, as discussed above.

FIG. 5C illustrates a voltage reference signal 670 generated in response to the differential clock signals. A voltage reference signal 670 is then adjusted by an offset amount to become the adjusted reference voltage signal 680. Comparing data signal 640 to the adjusted voltage reference signal 680, allows second system 10 to recover the data signal 690.

In view of the above disclosure, many other variations can be envisioned. For example, many other methods for determining a voltage offset amount can be envisioned. In other examples, many other ways of producing the adjusted reference voltage signal can be envisioned in light of the present disclosure.

In other embodiments of the present invention, combinations or sub-combinations of the above-disclosed invention can be advantageously made. The block diagrams of the architecture and flowcharts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for receiving data from a sending system in a receiving system comprises:

receiving a pair of differential clock signals from the sending systen;

determining a sending system reference voltage in the receiving system in response to the pair of differential clock signals;

receiving a test data signal from the sending system;

adjusting the sending system reference voltage to form an updated sending system reference voltage in response to the test data signal;

receiving a single-ended data signal from the sending system; and determining a data signal in response to the single-ended data signal and to the updated sending system reference voltage.

2. The method of claim 1 wherein determining the sending system reference voltage in the receiving system comprises dividing a voltage measured between the pair of differential clock signals.

3. The method of claim 1 wherein determining the data signal comprises comparing the data signal to the updated sending system reference voltage.

4. The method of claim 1 wherein the sending system reference voltage varies with time.

5. The method of claim 1 wherein adjusting the sending system reference voltage comprises adding a voltage offset to the sending system reference voltage or subtracting a voltage offset from the sending system reference voltage to form the updated sending system reference voltage.

6. The method of claim 5 wherein adjusting the sending system reference voltage also comprises comparing the test data signal from the sending system to the sending system reference voltage.

7. An apparatus for receiving data signals from a sending apparatus comprises:

a first circuit configured to receive single-ended data signals biased by reference voltage signals and differential data signals and determine a reference voltage signal's bias for the single-ended data signals in response to the differential data signals;

a second circuit coupled to the first circuit configured to determine an offset in a received data signal;

a third circuit coupled to the first circuit and to the second circuit configured to adjust the reference voltage signal's bias to form a margined reference voltage signal in response to the offset; and a fourth circuit coupled to the second circuit and to the third circuit configured to receive a single-ended data signal and a margined reference voltage and configured to output a data out signal, wherein the margined reference voltage is determined in response to the margined reference voltage signal.

8. The apparatus of claim 7 wherein the differential data signals comprise differential clock signals.

9. The apparatus of claim 8 wherein the first circuit comprises a divide by two circuit, and wherein the reference voltage signal is a voltage.

10. The apparatus of claim 7 wherein the first circuit comprises an analog to digital converter, and wherein the reference voltage signal comprises a digital value.

11. The apparatus of claim 10 wherein the third circuit comprises a digital to analog converter, and wherein the margined voltage signal comprises a digital value.

12. The apparatus of claim 9 wherein the third circuit comprises:
   a series of source follower circuits, each source follower coupled to receive the reference voltage signal and configured to output a unique margined reference voltage signnal; and
   a selector circuit configured to select output from one of the series of source follower circuits as the margined reference voltage signal in response to the offset.

13. The apparatus of claim 8
   wherein the first circuit is also configured to output a series of margined reference voltage signals,
   wherein the third circuit also comprises a selector circuit configured to select the margined reference voltage signal in response to the series of margined reference voltage signals and in response to the offset.

14. A system for receiving single-ended signaling data from a sending system includes.
   a voltage generating unit configured to receive a differential clock pair from the sending system, configured to generate a sending system reference voltage in response to the differential clock pair, and configured to generate an adjusted sending system reference voltage;
   an adjustment unit coupled to the voltage generating unit configured to determine an offset for the sending system reference voltage and configured to direct the voltage generating unit to generate the adjusted sending system reference voltage in response to the offset; and
   a receiver unit coupled to the voltage generating unit and to the adjustment unit configured to receive a single-ended signaling data from the sending system, configured to receive the adjusted sending system reference voltage, and configured to output adjusted data in response to the single-ended signaling data and to the adjusted sending system reference voltage,
   wherein the adjusted sending system reference voltage varies with time.

15. The system of claim 14 wherein the voltage generating unit comprises at least two resistors in series between the differential clock pair.

16. The system of claim 15 wherein the voltage generating unit also comprises:
   a series of voltage tap points, each voltage tap point having a voltage offset from the sending system reference voltage; and
   a selector configured to receive the offset and configured to select a voltage tap point as the adjusted sending system reference voltage in response to the offset.

17. The system of claim 15 wherein the voltage generating unit also comprises:
   an analog to digital converter configured to convert the sending system reference voltage to a digital value; and
   a digital to analog converter configured to receive the digital value and the offset, and configured to output the adjusted seding system reference voltage in response to the digital value and the offset,
   wherein the offset comprises another digital value.

18. The system of claim 14 wherein the adjustment unit is also configured to receive a single-ended signaling test data signal and is configured to determine the offset in response to the single-ended signaling test data signal and the sending system reference voltage.

19. The system of claim 14 further comprising another receiver unit coupled to the voltage generating unit and to the adjustment unit configured to receive another single-ended signaling data from the sending system, configured to receive the adjusted sending system reference voltage, and configured to output another adjusted data in response to the another single-ended signaling data and to the adjusted sending system reference voltage.

20. The system of claim 14 wherein a voltage difference between the adjusted sending system refcrence voltage and the sending system reference voltage are within approximately 33%.

* * * * *

UNITED STATES PATENT AND TRADEMARK OFFICE
CERTIFICATE OF CORRECTION

PATENT NO.    : 6,658,061 B1
DATED         : December 2, 2003
INVENTOR(S)   : Aninda Roy It is certified that error appears in the above-identified patent and that said Letters Patent is hereby corrected as shown below:

Column 2,
Line 4, should read:
-- According to another aspect of the invention, an apparatus --
Line 7, should read:
-- may include a first circuit configured to determine a refer --

Column 3,
Line 60, should read:
-- used to track the reference voltage within second system 110. --

Column 5,
Line 40, should read:
-- and the like are illustrated. In the present embodiment a --
Line 42, should read:
-- eye, however a larger number or smaller number may also --

Column 7,
Line 67, should read:
-- sending system; --

Column 9,
Line 6, should read:
-- age signal; and --

Column 10,
Line 18, should read:
-- adjusted sending system reference voltage in response to --

UNITED STATES PATENT AND TRADEMARK OFFICE
CERTIFICATE OF CORRECTION

PATENT NO. : 6,658,061 B1
DATED : December 2, 2003
INVENTOR(S) : Aninda Roy

It is certified that error appears in the above-identified patent and that said Letters Patent is hereby corrected as shown below:

Column 20,
Line 35, should read:
-- between the adjusted sending system reference voltage and --

Signed and Sealed this

Eighth Day of June, 2004

JON W. DUDAS
*Acting Director of the United States Patent and Trademark Office*